Oct. 8, 1963　　　　J. ROGERSON　　　　3,106,262
LUBRICATING SYSTEMS
Filed Oct. 31, 1961　　　　　　　　　2 Sheets-Sheet 1
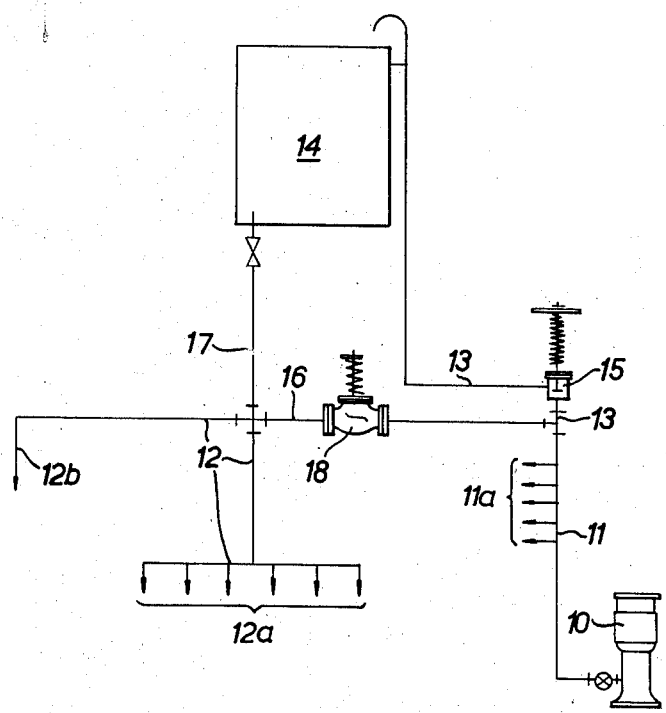
— FIG. 1. —
INVENTOR:
JOHN ROGERSON
BY *Imirie & Smiley*
　ATTYS.

Oct. 8, 1963    J. ROGERSON    3,106,262
LUBRICATING SYSTEMS
Filed Oct. 31, 1961    2 Sheets-Sheet 2
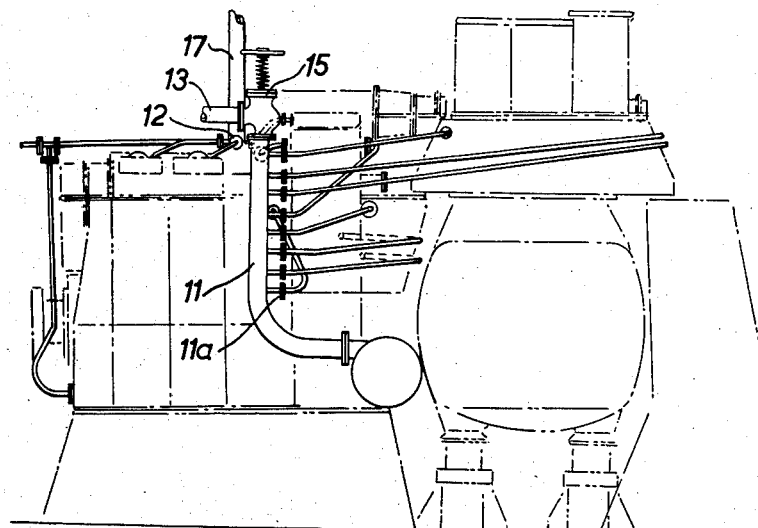
— FIG. 2.—
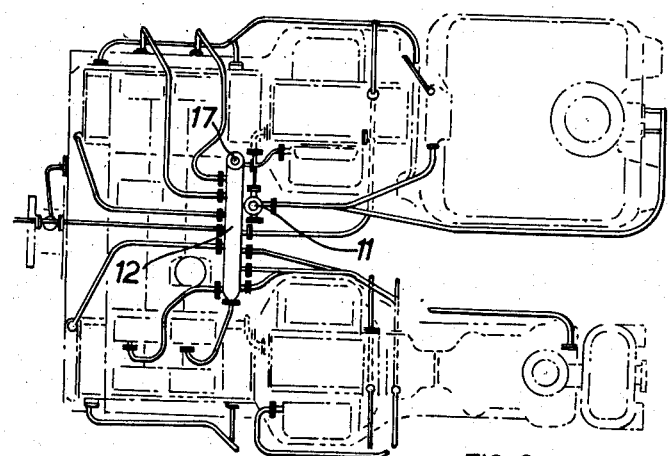
— FIG. 3.—
INVENTOR:
JOHN ROGERSON
BY *Minier & Smiley*
Att'ys.

United States Patent Office 3,106,262
Patented Oct. 8, 1963

3,106,262
LUBRICATING SYSTEMS
John Rogerson, Greasby, Wirral, England, assignor to Cammell Laird & Company (Shipbuilders & Engineers) Limited, Birkenhead, England, a British company
Filed Oct. 31, 1961, Ser. No. 148,955
2 Claims. (Cl. 184—6)

This invention is for improvements in or relating to lubricating systems and is more particularly although not exclusively concerned with the lubricating oil systems of main propulsion turbines and gearing.

Pinion and turbine journals now have a higher peripheral speed than was the case heretofore and are more heavily loaded and have smaller clearances than hitherto. The amount of heat generated is therefore greater and its effective dissipation demands a higher lubricating oil pressure than was previously made available. For instance, pressures of the order of 20 to 30 lbs. per square inch are required in order to obtain sufficient oil flow to the bearings. In addition to supplying oil to the bearings, however, the lubricating system also has to supply oil to sprayers designed to spray lubricating oil onto the gearing. To avoid oil starvation at the bearings and equally to avoid the excessive discharge of oil through the sprayers it is necessary that the oil should be supplied to the sprayers at a substantially lower pressure, e.g. a pressure of the order of 8 to 10 lbs. per square inch.

One object of the present invention is to provide a relatively simple arrangement whereby the differential oil pressure requirements of the bearings and the sprayers can be met and in which provision is also made whereby an emergency supply of oil is immediately available to the bearings should the pump pressure fail.

According to the present invention there is provided a lubricating system wherein a pump has its discharge side connected to bearings or other high pressure lubricating points and also to a gravity feed tank which supplies oil to gear sprayers and/or low pressure lubricating points, a restrictor valve being provided in the connection between the pump and the tank so as to restrict the flow to the tank and ensure an adequate oil pressure at the high pressure lubricating points.

In some embodiments of the invention a connection through a non-return or one-way valve is provided between the gravity feed tank outlet and the bearing high pressure lubricating points to provide for an emergency supply of oil from the tank to the bearings should the pump pressure fail.

The restrictor valve may be spring, weight or otherwise loaded and preferably means is provided for adjusting its loading so that the system will provide lubricating oil at any pressure variable within the range of the pump, to the turbine and gearing bearings, while simultaneously maintaining a constant pressure supply to the gearing sprayers. It will also be appreciated that the whole system will be supplied with lubricating oil by gravity feed, for a short period, in the event of failure of the supply pump.

Conveniently the non-return or one-way automatic emergency valve in the connection between the gravity feed tank outlet and the bearing high pressure lubricating points is also spring or otherwise loaded and means is provided for adjusting such loading.

One particular embodiment of the invention will now be described, by way of example, as applied to the lubricating oil system of main propulsion turbines and gearing. In the following description reference is made to the accompanying diagrammatic drawings comprising FIGURES 1, 2 and 3, wherein FIG. 1 is a diagram of a hydraulic pressure lubricating system according to the invention, FIG. 2 is a diagrammatic elevational view of the system of FIG. 1 as applied to a turbine and associated gearing, and FIG. 3 is a diagrammatic plan view of the apparatus shown in FIGURE 2.

Referring to the drawings 10 indicates a pump which feeds oil under pressure into the system which is designed to supply oil at, say, a pressure of approximately 30 lbs. per square inch, to several bearing lubricating points, indicated at 11a, via a manifold 11.

In addition to having a direct connection to the bearing lubricating points 11a, the pump 10 supplies oil via a pipe-line 13 to a gravity feed tank 14 from which oil is fed at the required pressure (e.g. 8 to 10 lbs./square inch) via a manifold 12 to gear sprayers 12a and low pressure main bearing lubrication points 12b. It will be appreciated that the pressure at which the oil is supplied to the sprayers 12a and lubrication points 12b will depend on the head of oil in the tank 14. This head is kept constant by maintaining the gravity feed tank at an overflow level.

A spring-loaded valve 15 is provided in the pipe connection 13 between the pump 10 and the tank 14 and the spring-loading on this valve is adjusted so that the pressure of oil can be proportioned between the bearing lubricating points 11a and the feed to the tank 14 to ensure that the bearings will receive oil at the required higher pressure. In other words, the system is such that increasing the pressure to provide high pressure lubrication at the bearings does not merely result in an excessive supply of oil to the sprayers, with little, if any, material increase in the oil pressure to the bearings, as would be the case if the bearing lubricating points 11a and the sprayers were connected in a common supply circuit from the pump.

It will be appreciated that instead of loading the valve 15 by means of a spring, it may be loaded by means of a weight, air cylinder or other device.

It will also be noted that in the arrangement shown in FIGURE 1 there is a pipe connection 16 between the delivery pipe 17, from the gravity feed tank, and the pipe 13 on the inlet side of the valve 15. In the pipe 16 there is provided an automatic emergency non-return or one-way valve 18.

The valve 18 is normally held closed by the higher pressure in the portion of the pipe 13 to which it is connected, this portion of the pipe 13 being connected directly to the pump outlet. Should the pump 10 fail there will be no pressure on the valve 18 acting to hold it closed and oil will then flow from the tank 14 not only to the sprayers 12a and low pressure bearing points 12b but also, for a short period, via the valve 18 to the bearing lubricating points 11a. Thus, lubrication will be maintained in the case of a pump failure for a sufficient time to enable the turbine to come to a halt without damage due to lack of lubrication.

In the arrangement shown in FIGURES 2 and 3 the layout of the lubricating oil pipes is in the form of two short distribution pipes or manifolds 11 and 12, the manifold 12 lying horizontally in the vicinity of the gear case, for supplying oil to the sprayers, while the manifold 11 is a vertical pipe, placed at the centre of the main gear case between the two primary flexible couplings, for supplying oil to bearings. At a convenient position and forming the top of the vertical manifold 11 is the spring-loaded pressure control valve 15. The object of this arrangement is to obtain a continuous rise from the lubricating oil pump discharge connection to the top of the gravity tank in order to eliminate air pockets and positions where foreign particles might accumulate.

In the case of the horizontal manifold 12 supplying oil to the sprayers one end is joined directly to the pipe connection 17 from the gravity tank while the other end is connected to a sprayer selected as requiring the greatest amount of oil is order that the rate of flow through the manifold will be maintained as high as possible. The end of the manifold 12 is coned to suit this connection in order to obviate corners in which foreign particles might accumulate.

Preferably all pipes including the manifolds are as small in bore as possible consistent with the amount of lubricating oil they are required to pass and the system is designed on the basis of maximum permissible oil velocity at maximum power.

I claim:

1. A lubricating system comprising a pump for lubricant, high pressure lubricating points, pipe means connecting said high pressure lubricating points to said pump for the supply of lubricant at high pressure to said high pressure lubricating points, an elevated gravity feed tank for lubricant, low pressure lubricating points, pipe means connecting said low pressure lubricating points to said tank for the supply of lubricant at low pressure to said low pressure lubricating points, pipe means connecting said pump to said gravity feed tank for the pumping of lubricant to said tank, a pressure regulating valve in said pipe means connecting the pump to the tank and operative to proportion the supply of lubricant between the high pressure lubricating points and the tank, thereby to provide that the flow of lubricant to the tank is restricted to an amount which will ensure that adequate lubricant is made available to the high pressure lubricating points, pipe means connecting an outlet of the gravity feed tank to the high pressure lubricating points and a one-way valve in said last mentioned pipe means and operative to provide an emergency supply of lubricant from the tank to the high pressure lubricating points should the pump pressure fail.

2. A lubricating system comprising a pump for lubricant, high pressure lubricating points, pipe means including a substantially vertical manifold connecting said high pressure lubricating points to said pump for the supply of lubricant at high pressure to said high pressure lubricating points, an elevated gravity feed tank for lubricant, low pressure lubricating points, pipe means including a substantially horizontal manifold connecting said low pressure lubricating points to said tank for the supply of lubricant at low pressure to said low pressure lubricating points, pipe means connecting said pump to said gravity feed tank for the pumping of lubricant to said tank, and a pressure regulating valve, having means whereby it can be adjusted manually, located at the top of the vertical manifold in said pipe means connecting the pump to the tank and operative to proportion the supply of lubricant between the high pressure lubricating points and the tank, thereby to provide that the flow of lubricant to the tank is restricted to an amount which will ensure that adequate lubricant is made available to the high pressure lubricating points, pipe means connecting an outlet of the gravity feed tank to the high pressure lubricating points and a one-way valve in said last mentioned pipe means and operative to provide an emergency supply of lubricant from the tank to the high pressure lubricating points, should the pump pressure fail.

References Cited in the file of this patent
UNITED STATES PATENTS

| | | |
|---|---|---|
| 846,794 | Kruesi | Mar. 12, 1907 |
| 2,229,655 | Kocher | Jan. 28, 1941 |
| 2,343,492 | Bartolet | Mar. 7, 1944 |
| 2,497,695 | Sheppard | Feb. 14, 1950 |